US 6,631,184 B1

(12) United States Patent
Weiner (10) Patent No.: US 6,631,184 B1
(45) Date of Patent: Oct. 7, 2003

(54) SYSTEM FOR COMMUNITY GENERATED FEEDBACK AND/OR RATING

(75) Inventor: Moshe Weiner, Kiron (IL)

(73) Assignee: Comverse Ltd., Tel Aviv (IL)

( * ) Notice: Subject to any disclaimer, the term of this patent is extended or adjusted under 35 U.S.C. 154(b) by 556 days.

(21) Appl. No.: 09/624,165

(22) Filed: Jul. 24, 2000

(51) Int. Cl.[7] ............................................. H04M 11/00
(52) U.S. Cl. ................................ 379/92.01; 379/92.04; 379/93.19
(58) Field of Search ........................... 379/92.01, 92.03, 379/92.04, 93.17, 93.19, 93.23, 93.24, 93.25, 93.26; 455/414, 456, 556, 557; 705/10, 12, 26

(56) References Cited

U.S. PATENT DOCUMENTS

| | | | | |
|---|---|---|---|---|
| 5,950,172 A | * | 9/1999 | Klingman | 705/26 |
| 5,970,121 A | * | 10/1999 | Homayoun | 379/92.01 |
| 6,317,718 B1 | * | 11/2001 | Fano | 705/1 |
| 6,401,029 B1 | * | 6/2002 | Kubota et al. | 701/201 |
| 6,510,427 B1 | * | 1/2003 | Bossemeyer, Jr. et al. | 705/10 |
| 6,522,875 B1 | * | 2/2003 | Dowling et al. | 707/100 |

* cited by examiner

Primary Examiner—Stella Woo
(74) Attorney, Agent, or Firm—Sughrue Mion, PLLC (57) ABSTRACT

A telecommunications network system and method enabling feedback and rating data corresponding to products, services, or product or service providers to be shared among users in real-time. Feedback and rating data can be entered into a database using a telecommunications device, such as a wireless telephone, a wireless hand-held data entry/storage device, PC, and the like. The user entering the data can also input community information relative to his or her community attributes and/or affiliations and the user's physical location is also entered via a user location device and system, such as GPS or a terrestrial system such as AOA, TOA, or the like. The data is stored and processed in accordance with the community and location data and is available in real-time to other users requesting the feedback/rating information. The users requesting the data can enter specific community data requirements so that the data is organized to best fit their own community attributes or affiliations. Thus, highly relevant and timely feedback and rating data is available to users due to the community-organized and real-time data entry/retrieval aspects of the invention.

26 Claims, 7 Drawing Sheets

SYSTEM FOR COMMUNITY GENERATED FEEDBACK AND/OR RATING

FIELD OF THE INVENTION

The present invention relates to a system for creating and retrieving feedback and rating information for products, services, and product or service providers using telecommunications systems, and more particularly, to a mobile cellular and/or wireline communications system for providing and retrieving community-generated feedback and rating information based on user-defined communities. The system is operable in conjunction with a user location determiner and a user data input/output device.

BACKGROUND OF THE INVENTION

A "community" as used herein is defined as any group of people who are associated by some common factor, or factors, who are users of communication products and services, and who may derive added value from an evaluation service through the use of these telephones in relation to their activities while they are travelling. A "mobile community" as used herein is defined as a group of community members who are also users of cellular telephones. Since these cellular telephone users are also consumers, they are faced with the choice of which product or service to purchase and from which provider.

"Mobile Commerce", that is, trade based on usage of cellular handsets for the purchase or sale of products and services, is becoming an increasingly important element in commercial transactions. Although a cellular telephone is most often physically with its owner, its potential to provide its user with recommendations and rating information for a service, a product or a product or service provider has not been exploited. In particular, there does not appear to be any existing method or system which generates feedback or rating information while getting the input from community members.

Although, in workstation-based computer communications there are Internet web sites that provide and are able to receive feedback for a specific issue, such as restaurants, conventional systems do not appear to embrace a method or device that will gather and provide ratings and feedback to and from a cellular device to cellular community members. Internet web types of feedback are neither community-based nor cellular-based and also do not have a database for a wide variety of products, services, or product or service providers.

Existing Internet-based feedback systems may provide feedback or ratings, but these are not always available for a user. The feedback can be entered only after a user has the opportunity to physically go to where a PC is located, a PC, that is, that a user is authorized to use. Thus, feedback will not always be entered and many impressions related to a particular experience involving transactions for products and services and their providers can be forgotten until a user gets to his or her PC.

Those who rely on laptops can more readily retrieve and provide feedback, but since this feedback is also generated over the Internet and is not user-community specific or organized, except in very broad user categories in so-called "virtual communities", a laptop user may not be provided with relevant information for his or her particular needs or from his or her particular community group. A "user-community", as defined herein, is one specifically composed of those who are engaged in some common, activity, such as mobile communication, and share at least one common attribute, affiliation, or association with others in the group, and who have but are not necessarily related via an Internet connection. A mobile telephone user, for example, can be characterized as present in a particular location at a particular time, whereas one engaged in a virtual community need not be location or time dependent.

Furthermore, existing feedback systems have all users in the same group, thus when someone needs a recommendation or rating for a service or product, a user might receive incorrect or unreliable information as a user might get it from a group of people who have completely different interests or affiliations. Therefore, a recommendation based on their feedback may not be relevant. For example, if one is looking for a good restaurant for a business meeting, one would not like to go to a restaurant for tourists even if it received the highest rating in town, because most of the evaluators were tourists.

A businessman would prefer to get a recommendation for a restaurant for a business meeting from his business colleagues who probably belong to one of his communities.

Furthermore, as existing solutions do not define communities as defined above, the amount of information retrieved for qualitative feedback from virtual communities may be so great as to be unusable. The extent of the information provided makes it almost impossible to navigate within this database, since such information will not have been generated by like-users in specific locations and will have filtering and sorting problems in order to find recommendations which a user can trust.

Also, existing solutions do not integrate newly-available technologies, such as a wireless electronic pen and an electronic writing pad, to enable providing of feedback using freehand drawing and writing.

New, emerging, cellular technologies, such as General Packet Radio Service (GPRS), Enhanced Data GSM Environment (EDGE), Universal Mobile Telecommunications System (UMTS), and the like, now enable a cellular telephone to communicate qualitative feedback, including voice, video, image, text, and the like, however, this feedback has thus far not been of the type which exploits the feedback and rating information potential of users in user-communities.

Therefore, it would be desirable to provide a system for generating mobile community feedback and ratings based on user-defined communities of interest using a wireless pen and an electronic writing pad in cooperation with mobile telephone users communicating over their cellular telephones. Feedback may also be generated or retrieved by users of traditional wireline communication products and services, such as a wireline telephone, a PC,.or a PDA.

SUMMARY OF THE INVENTION

Accordingly, it is a principal object of the present invention to overcome the disadvantages of the prior art and to provide a user-friendly network system for providing and retrieving feedback and rating information in realtime in regard to products, services, or the providers of products or services, based on one or more user-defined communities of interest, the network system comprising a data input device operable to facilitate entry of data by a user, a user location determiner operable to determine the location of the user, a first interface operable to provide feedback categories and rating information associated with the data entered by a user, a second interface operable to retrieve feedback and rating information and present them to a user, a feedback and rating information server in communication with the data input device operable to process this data, a communities server in communication with the data input device and operable to provide details about communities with which the user defines a relationship, and a location server in communication with the user location determiner and operable to provide details of providers of products and services in relation to the user location.

It is another object of the present invention to provide a method for providing and retrieving feedback and rating information in regard to products and services, and providers of products and services comprising the steps of entering feedback data corresponding to at least one of a product, service, and providers thereof, into a telecommunications device, transmitting this feedback data to a database via a network, locating a physical location of a user entering this data, providing the user's physical location to a database, storing information relative to different user's attributes in a server, and processing the data with the previously stored information such that quantitative and qualitative feedback data for at least one of similar products, services and provide thereof are organized in accordance with pre-selected community requirements.

Another object of the invention is to provide a mobile device for creating and retrieving feedback and rating information, such device comprising a data input device for inputting feedback information, a display for viewing a feedback creation or retrieval form, and a transmitter and receiver operable to transmit and receive the information.

A further object of the invention is to provide a location server within a network system for providing and retrieving feedback and rating information in real-time in regard to products, services, or the providers of products or services, such location server rationally utilizing the location of various services and products in comparison with the current location of a user of the network server.

Yet another object of the invention is to provide a method for creating a new input for a new product or a service, or for accessing information regarding an existing product or service, on a form including a category field, a name field, a community field, a quantitative rating field, and a qualitative feedback field; such method comprising the steps of inputting identifying information for a product or service in a category, name, and community fields on the form, and inputting feedback regarding the product or service in the qualitative and quantitative fields.

It is yet a further object of the invention to provide a method for retrieving stored feedback or rating information for a service, a product, or a provider thereof, or for accessing information regarding an existing product or service, on a form including a category field, a name field, an e-mail field and/or a phone field, and a community field; such method comprising the steps of inputting identifying information for a product or service in category and name fields on the form, choosing a community from the community field, and receiving quantitative and qualitative output.

Yet a further object of the invention is to provide a data terminal for use by a user who is a member of a community, the data terminal comprising a receiving unit receiving, in response to a request for information about a product or service, feedback information only from the user's community, and a display unit displaying received feedback information.

Yet another object of the invention is to provide a data terminal for use by a user who is a member of a community, the data terminal comprising an input unit receiving feedback data from the user about a product or service, and a transmitting unit coupled to the input unit and transmitting the feedback data and a community identifier to a feedback server.

In accordance with a preferred embodiment of the present invention, there is provided a qualitative feedback interface utilizing voice or text massaging, and a quantitative ratings interface. The system enables voice, freehand writing and drawing, and keyboard (via phone buttons) text-based feedback. In order to enable freehand drawing or writing, the invention is capable of integrating a wireless pen device connected to a cellular telephone device which allows for creative, freehand communication of feedback and ratings. Such a pen device also enables short, freehand messages.

A principal embodiment of the invention is the integration of feedback searches based on the location of a user and searches which take into account the recommendations of the user's own community. Such searches are, in a preferred embodiment, performed by users of mobile cellular telephones. The advantage of mobile cellular telephone feedback is that it can be done immediately, in real time, after receiving a service or a product, so that the impression is still fresh in the mind of the consumer and details are not forgotten. It should be noted, however, that the invention, as described herein, is not limited to providing and retrieving information in real-time, nor by a particular method of communication access (that is, wireless or wireline, or by any particular kind of data terminal). A user may provide feedback about a service or product any time after receiving the product or service. Similarly, a user may submit a request for feedback, and then retrieve the requested feedback at a later time.

The system enables feedback which is convenient, immediate, and easily entered. In a preferred embodiment, Obviously, a user can choose to provide feedback or ratings at any time convenient to the user, and not necessarily immediately.

Thus it can readily be appreciated that the present invention meets the need for a new method for creating and retrieving on-the-spot, real-time qualitative and quantitative feedback and ratings for products, services, and their providers. The system of the present invention is based on the feedback and ratings created by members of mobile and/or non-mobile communities, while a user can choose which community to consult.

Most users are quite willing to provide feedback for a service, a product, or their providers with which they have had experience, especially when their experience, whether positive or negative, is still fresh in their minds. Such feedback can be qualitative or qualitative. For example, a qualitative feedback may be a voice or text message describing what was particularly good, what was extremely bad, or what to pay attention to, and the like. Quantitative feedback may be based on a scale, such as 10 for "excellent", 5 for "OK", and 0 for "bad", or any similar rating scale which allows for logical comparison and analysis. The system can then provide for both qualitative feedback and a quantitative rating for a service, a product or their providers.

The present invention provides a new method of categorizing the feedback which makes use of a user-defined community. A user is able to search for ratings or qualitative feedback by consulting various communities, either those to whom he or she belongs or public communities that were established by the system (e.g., citizens of London, or British tourists in New York). When providing feedback, a user can specify whether he or she would like the system to use it for public communities. For example, if one is registered in a community as an Israeli and has feedback about an interesting place to visit in Thailand, the system can use this feedback for its public community (e.g., Israeli tourists in Thailand).

The present invention enables community members to define new services or products for which they would like to get ratings and feedback (also the system can create new items for evaluation). The invention is thus a dynamic system with updated databases that serve the interests of the various mobile communities as defined by the users.

The invention can provide feedback about many items that are user defined. This means that the system reflects a very good market sense, i.e., a rationalized and targeted market, as people tend to create feedback on items which they need and want. The system does not, necessarily, have to define new items for ratings, but can rely on the users to provide this.

As quality seems to be a substantial issue when a service or a product is concerned, the present invention sets a new direction for disseminating different user' preferences. The invention is based on the common wisdom that community members will prefer to purchase a commercial service or a product after it has been recommended by their community members rather than simply getting the service or the product from the closest provider.

Using community-based feedback enables the accumulation of a smaller amount of qualitative data as feedback data. Thus, qualitative feedback can be easily examined instead of having a lot of data, such as resulting from surfing Internet virtual communities for ratings or feedback, a task often resulting in completely irrelevant information since the sources for such feedback and ratings are, in general, people with very different community interests.

Other features and advantages of the invention will become apparent from the following drawings and description.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which.

DETAILED DESCRIPTION OF THE PREFERRED EMBODIMENTS

Figure 1:
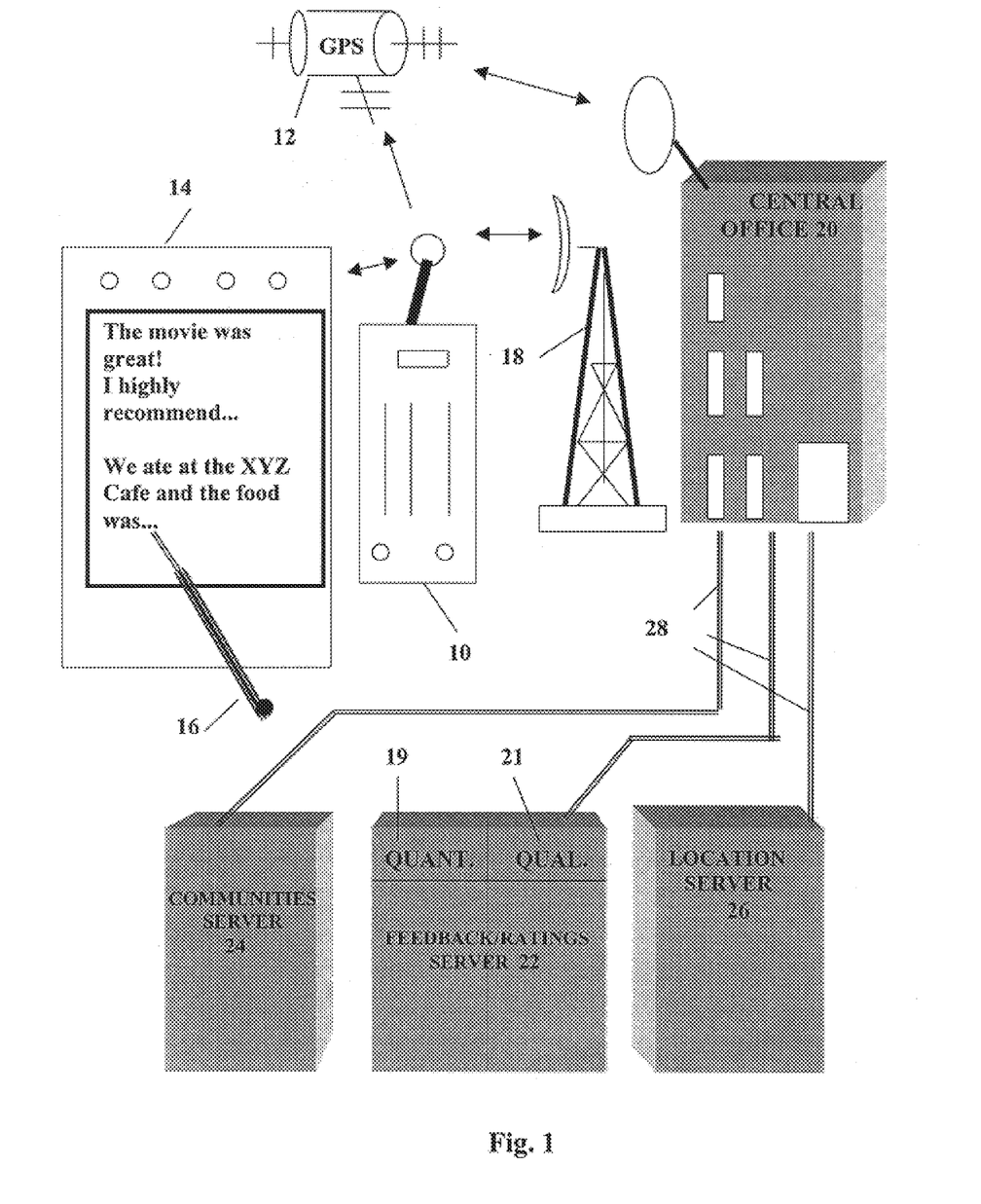
FIG. 1 depicts a figurative block diagram of a preferred embodiment of a system in accordance with the present invention.

Referring to FIG. 1, there is depicted, in a figurative block diagram, the system of the present invention comprising the following elements: a user terminal 10 provided with telecommunications access to a user location determiner 12, which could be a satellite system such as the Global Positioning System (GPS) or any of a number of terrestrial systems (for example, Angle of Arrival or AOA, Phase of Arrival or POA, Phased Array, Time of Arrival or TOA, or Differential Time of Arrival or DTOA, or some similar such system); a freehand, writing/drawing input/output device 14 that enables a user to interact with the system using a pen-like device 16; a communication network 18, such as a cellular network in one embodiment of the invention, including a central office 20 that can provide an access point to a feedback/ratings server 22; a communities server 24 for storing and processing communities data; and a location server 26 for storing and processing location data for products, services, and product and service providers. In a preferred embodiment, terminal 6 is a mobile cellular telephone, but also may be any other type of a terminal, such as a wireline phone, a PC, a terminal connected via cable modem, and the like. Access to feedback/ratings server 22 does not have to be direct. It can be via the Internet for example. In a preferred embodiment of the invention the servers are accessed by cable links 28 through central office 20.

The feedback/rating server 22 comprises two sub-elements: a quantitative (QUANT.) feedback server element 19 for a designated scale of ratings and a qualitative (QUAL.) feedback server element 21 for more subjective feedback. Any of the server elements in FIG. 1, such as the feedback/rating server 22 or the quantitative feedback server 19 or the qualitative feedback server 21 or the communities server 24 or the location server 26, may be combined in any combination in one or more pieces of physical hardware. However, these elements are portrayed separately in FIG. 1 solely for the sake of clarity of explanation and understanding.

The quantitative server element 19 holds the information about ratings associated with various communities. Each item, i.e., product, service, or provider thereof, is sorted by various communities as defined herein. Sorting is generally performed in a communities server for communities parameters, and similarly, in a location server for location parameters. The general rating provides a number on a given scale which represents the rating of a specific item out of a total number of similar items. This rating is calculated from the ratings received in reference to all similar items. The feedback scale can be, for example: "Excellent"=10 points, "OK"=5 points, "Bad"=0 points as in a preferred embodiment of the invention. Each item will be rated using this scale for price, quality and service as well as according to the distance from a user's current location of the particular item being rated.

Another element of the feedback/rating server 22 is a qualitative (QUAL.) server element 21 which stores qualitative feedback for each item. This feedback can be recorded using various media, e.g., video, audio, freehand drawing or text, keyboard text, and the like, and upon request by a user, this feedback information can be retrieved in the particular medium format in which it is stored. Each item's feedback, whether quantitative or qualitative, is sorted according to various communities provided by data from the communities server and in relation to location data provided from a location server. Details about various communities are kept within Communities Server 24 which also stores information about particular communities' members. Furthermore, Communities Server 24 enables the system to define communities in accordance with the stored data.

Location Server 26 provides rational usage of the location where various services and products are available in comparison with the current location of a user via data provided from User Location Determiner 12, which is communicated from Central Office 20. The location data received from User Location Determiner 12 are processed and stored in Location Server 26 and provided to enable a user to choose a closer item from two that have the same rating. Also a user can choose a lower rating, but a closer location to a provider. Location Server 26 enables feedback and rating data stored in Feedback and Ratings Server 22 to be geographically related to the location of a product, service, or product or service provider and the location of the user. For example, the user may request feedback about a fish restaurant and be provided with a number of them rated not only qualitatively or quantitatively, but also in rank according to their proximity to the user. Thus the user can choose a fish restaurant close by from those rated, and not only rely upon the ratings to make a decision where to dine out.

Figure 2:
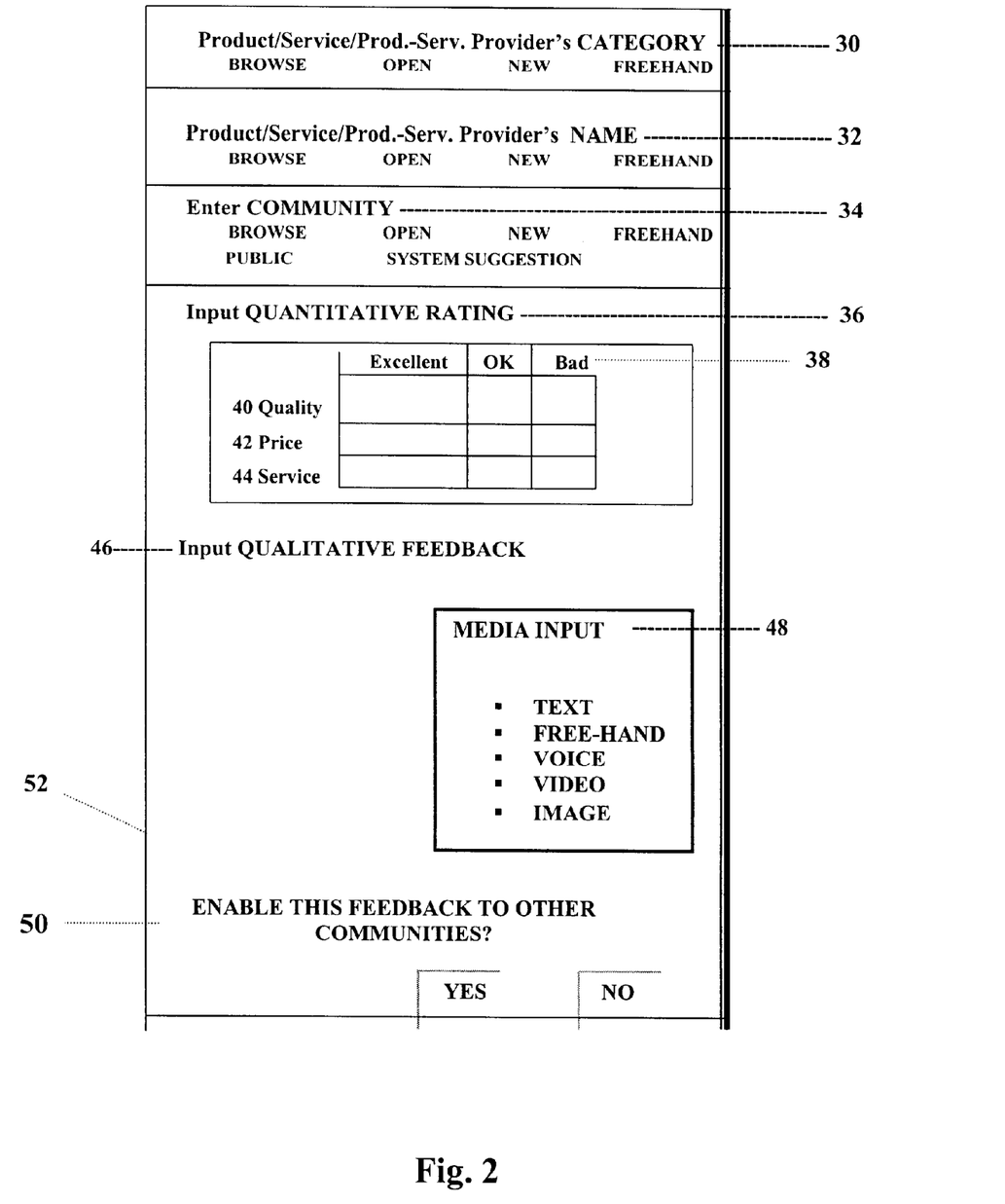
FIG. 2 depicts a preferred embodiment of the feedback/rating creation interface.

Referring now to FIG. 2, there is depicted a feedback/rating creation Interface 52 in accordance with a preferred embodiment of the present invention. Interface 52 is a digitized data entry form accessible over a communication terminal, be it wireless or wireline, such as user terminal 10 and displayed on input/output device 14 (as shown in FIG. 1). These enable a user to create a new input for a service or product, or to access information regarding an existing product or service. A user can then attach qualitative and feedback to such a service or product which may then be shared with one or more user-defined communities.

As shown in FIG. 2, a user first enters the identifying information of an item in Category field 30, Name field 32, and Community field 34, respectively. Various other options, such as a browse function, and freehand response are also provided in the various fields as appropriate. For example, in the data field, community 34, a user may choose to accept the system suggestion for a name to characterize a community to use.

Figure 4:
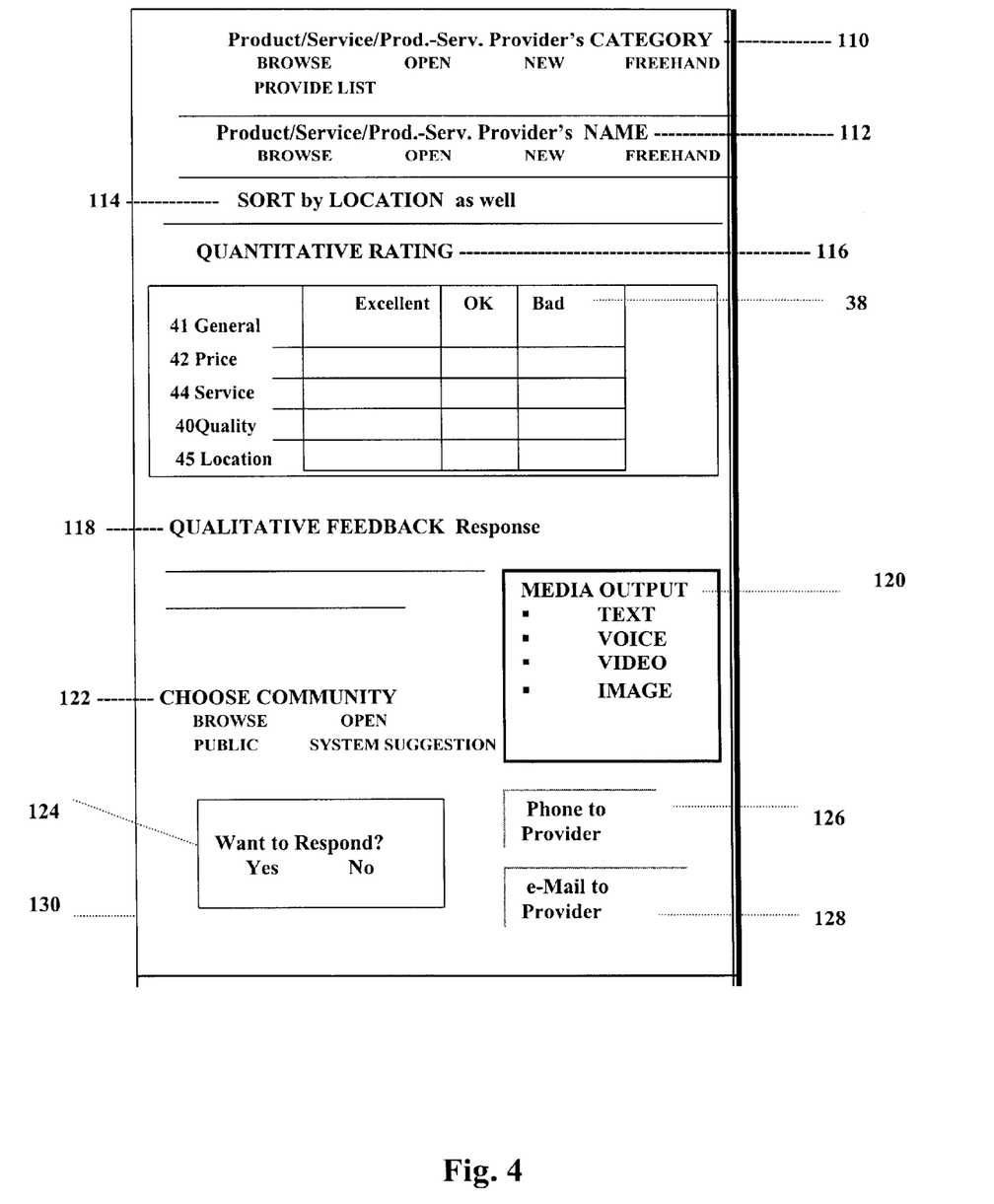
FIG. 4 depicts a preferred embodiment of the feedback/rating retrieval interface.

The browser option is included in all three identifying fields for Category 30, Name 32, and Community 34 (and, as explained below, in the comparable fields, Category 110, Name 112, and Community 122 provided in Feedback Retrieval form 130 as shown in FIG. 4).

Next, the user is asked to input Quantitative Rating in field 36 which displays a three-level rating scale 38 for an item based on the factor-fields of Quality 40, Price 42, and Service 44. The user is then provided with a field, input Qualitative Feedback 46 and an options field for Media Input 48, which allows a user to input qualitative feedback in a variety of media, such as Text, Freehand, Voice, Video, Image, or any other media suitable for providing feedback in accordance with the principles of the invention. Finally, in enable field 50, Feedback Creation Interface Form 52, asks a user to enable the feedback created by the user to be shared with other communities, or not, as the user may choose, by selecting a simple yes or no answer. This decision is left up to the user as some feedback information may be of only very narrow interest, i.e., user community-specific and of no value outside the user's community or, in the opinion of the user, not for broad dissemination.

Figure 3A:
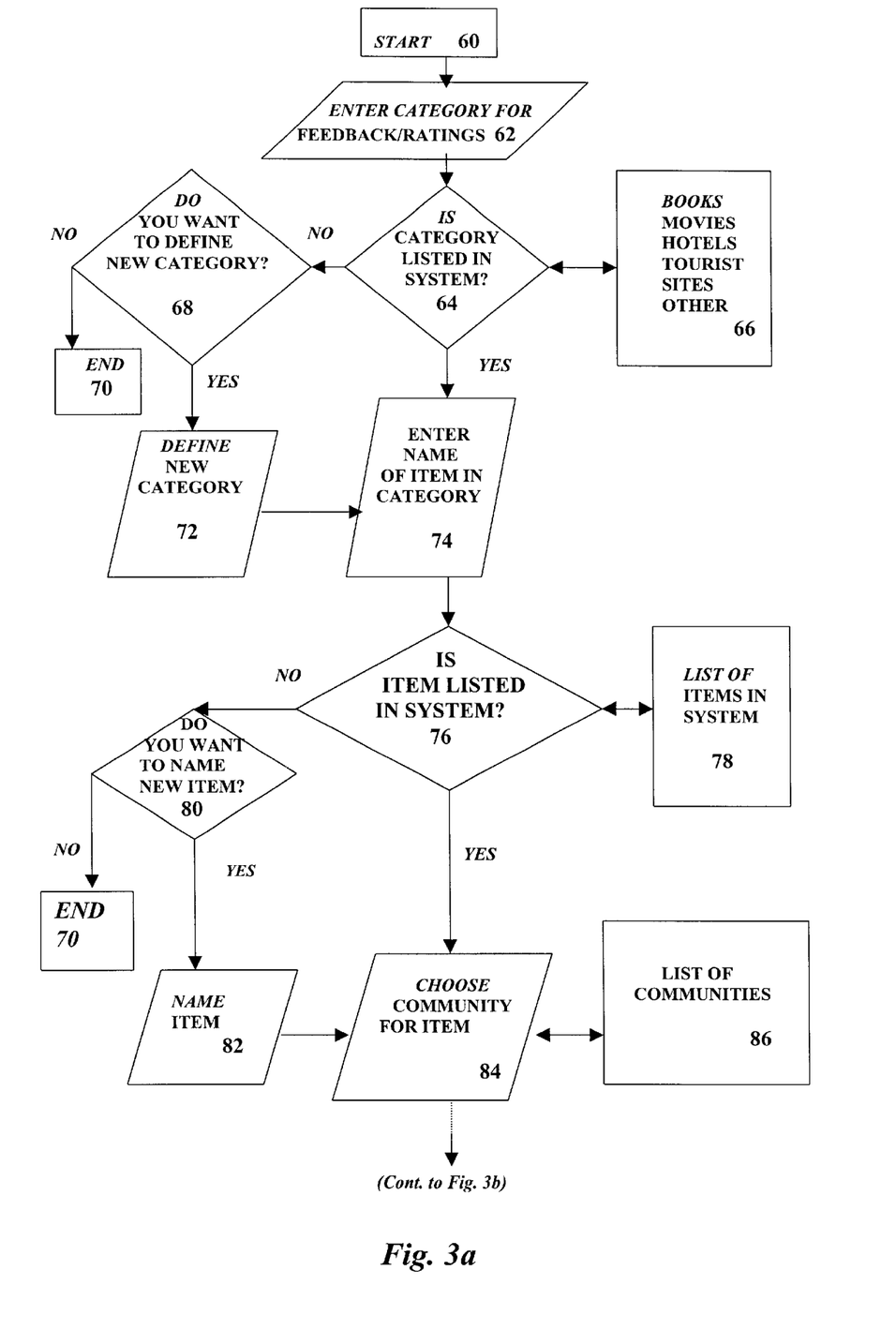
FIGS. 3a and 3b depict a flow chart of the feedback/rating creation process in accordance with the principles of the present invention.
Figure 3B:
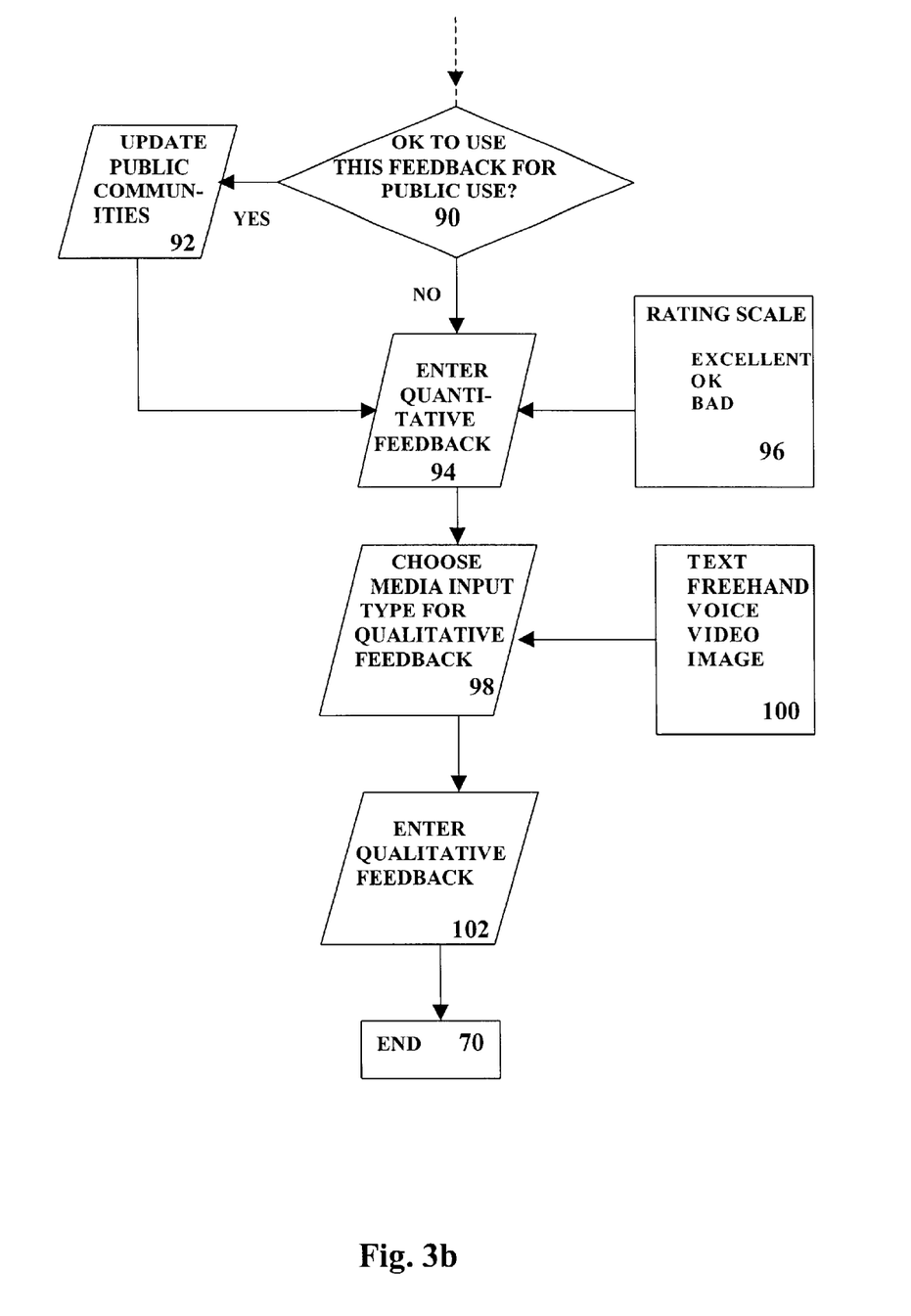

FIGS. 3a and 3b depict two sequential sections of a flow chart of the feedback/rating creation process in accordance with the principles of the present invention using the Feedback Creation Interface form 52 as described above and depicted in FIG. 2. The reference numbers in parentheses after a step number in the flow-chart represent the analog of the field in the interface form 52 as shown in FIG. 2.

Referring now to FIG. 3a, a user can download Feedback Creation Interface form 52 (shown in FIG. 2) in Start block 60 and is asked in block 62 (30) to enter a category of an item to be rated or provided with feedback from a user, such as books, movies, hotels, tourist sites, and the like. Decision block 64 asks: "Is Category (already) listed in (the) system?" In a preferred embodiment, categories are provided to a user for decision-making in the feedback/ratings process enabling a user to find an existing category or specify one that already exists by using the browser functions provided by the system for browsing in database 66 which is stored in Feedback Server 22 (shown in FIG. 1).

If a category is not registered, that is, listed in the system, the user is given the option to define it, in block 68 ("Do you want to Define New Category?") or else exit the system in End, block 70. Define New Category block 72 allows the user to provide the system with a new category which is saved by the system in Feedback Server 22 (FIG. 1). After defining a new category in block 72, the user continues with the next step in the feedback process in block 74 (32) which entails entering the name of an item in a category, that is, a product, service, or product/service provider, for which or whom to create feedback/ratings. If the item is listed in the system, an affirmative answer in decision block 76 moves the user to block 84 (34) wherein the user then chooses a community for the item. A database 78 of items, in the preferred embodiment of the invention sorted by type, i.e., product, service or provider, is conveniently made available to the user to consult in step 76 of the feedback/ratings creation process. Data from database 78 is also stored and processed in Feedback/Ratings Server 22 (shown in FIG. 1).

If the answer given by a user in decision block 76 is negative, the user is given the option to name a new item in block 80 or to exit the system in block 70. A new item name provided by a user in block 82 is also saved by the system in Feedback Server 22 (FIG. 1). Upon naming a new item in block 82, the user then resumes the work flow in the feedback process at block 84 (34) where the user is asked to choose a community for the item. A communities database 86 is conveniently made available to the user to browse at step 84 (34) of the feedback/ratings creation process. Data from database 86 is maintained in Communities Server 24 (shown in FIG. 1).

FIG. 3b depicts a continuation of the steps depicted in FIG. 3a in the user feedback/ratings creation process in accordance with the principles of the present invention. Continuing with the process, a user is provided with decision block 90 (50) wherein the user may choose to permit the use of his or her feedback/ratings for public use. If affirmative, the system automatically updates public communities in the step shown in block 92 and saves the feedback in Communities Server 24 (see FIG. 1). If negative, the decision made in block 90 guides the user directly to the next step in the feedback/ratings creation process omitting the step in block 92.

In block 94 (36), a user enters Quantitative Feedback for an item guided by rating scale menu 96 (38) provided by the system in Feedback Creation Interface form 52 (shown in FIG. 2). Rating scale menu 96 (38) provides broad ratings of "Excellent", "OK" or "Bad". The user applies this three-tiered scale in relation to the factors of price, quality, and service (as shown in FIG. 2 where the factors Price 42, Quality 40, and Service 44 are displayed to the user under Quantitative Rating 36). A rating for service (factor 44 in FIG. 2) is especially useful since it is based upon immediate impressions of the user which are hard to recall at a later stage without the aid of the advantageous, real-time system of the present invention.

Next, in block 98, a user is given the option to choose the media input type from media input type menu 100 (48), provided by the system. The medium selected, such as audio (speech input), keyboard (phone buttons) typing, freehand writing, or by taking video pictures (still or moving) is then used to input Qualitative Feedback in block 102 (46). The user concludes the feedback/rating creation process and exits the system in End block 70.

FIG. 4 depicts a Feedback/Rating Retrieval Interface 130, which, in a preferred embodiment, is a digitized form accessible over a wireless terminal, enabling a user to retrieve stored feedback/rating information for a particular item or group of items. Retrieval Interface 130 enables a user to retrieve both qualitative feedback and quantitative rating and feedback from feedback/ratings server 22 (shown in FIG. 1).

As shown in FIG. 4, a user first enters the identifying information of an item in Category field 110 and in Name field 112. The user is provided with an option in Category field 110 to have a list of categories for comparison purposes. A Sort by Location (as well) field 114 offers a user the benefit of knowing how handy access is to those items which may be of greatest interest for the user due to their likely proximity. For example, the Sort by Location field 114, if selected, will sort the retrieved information by location based on proximity to the user, with the closest in proximity displayed first. Various other options, such as a browse function, and freehand response are also provided in the various fields of Interface 130, as appropriate.

Next, the user is provided with a Quantitative Rating field 116 which displays the system ratings for an item based on the factors of Quality 40, Price 42, and Service 44 with the addition of a Location field 45 and a General Rating field 41. Location field 44 provides for user retrieval of location information stored in the feedback and rating information databases relating to selected products or services (such as car distance, walking distance, or far away—plane distance from such products or services). The user then is provided with media options, such as text, voice, video, and image, as in this example from a preferred embodiment of the invention and displayed in Media Output field 120 to output Qualitative Feedback in field 118. The user is then requested to choose a community, in Community field 122 for purposes of providing information relevant to the needs of these users. Various options, such as browse, open, public, and system suggestion for communities are provided to a user in conjunction with field 122.

Additionally, in the case of a mobile telephone user, Feedback Retrieval Interface form 130, in an optional Response ("Want to Respond?") field 124, asks the user if he or she wishes to contact the product/service provider by E-mail field 128 or Phone field 126 through the fortuitous use of the conveniently-available mobile cellular telephone already in the hands of the user.

Figure 5A:
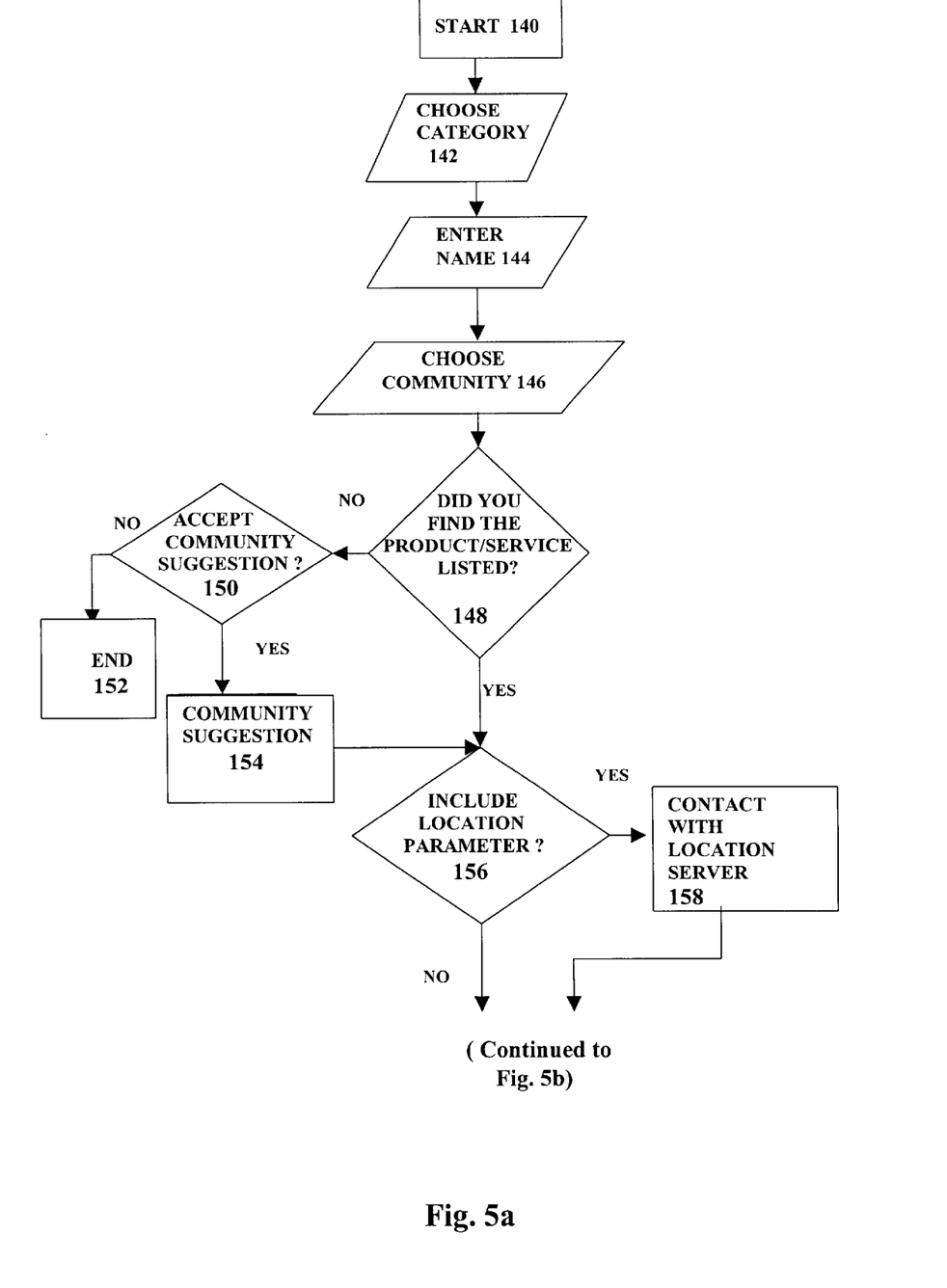
FIGS. 5a and 5b depict a flow chart of the feedback/rating retrieval process in accordance with the principles of the present invention.
Figure 5B:
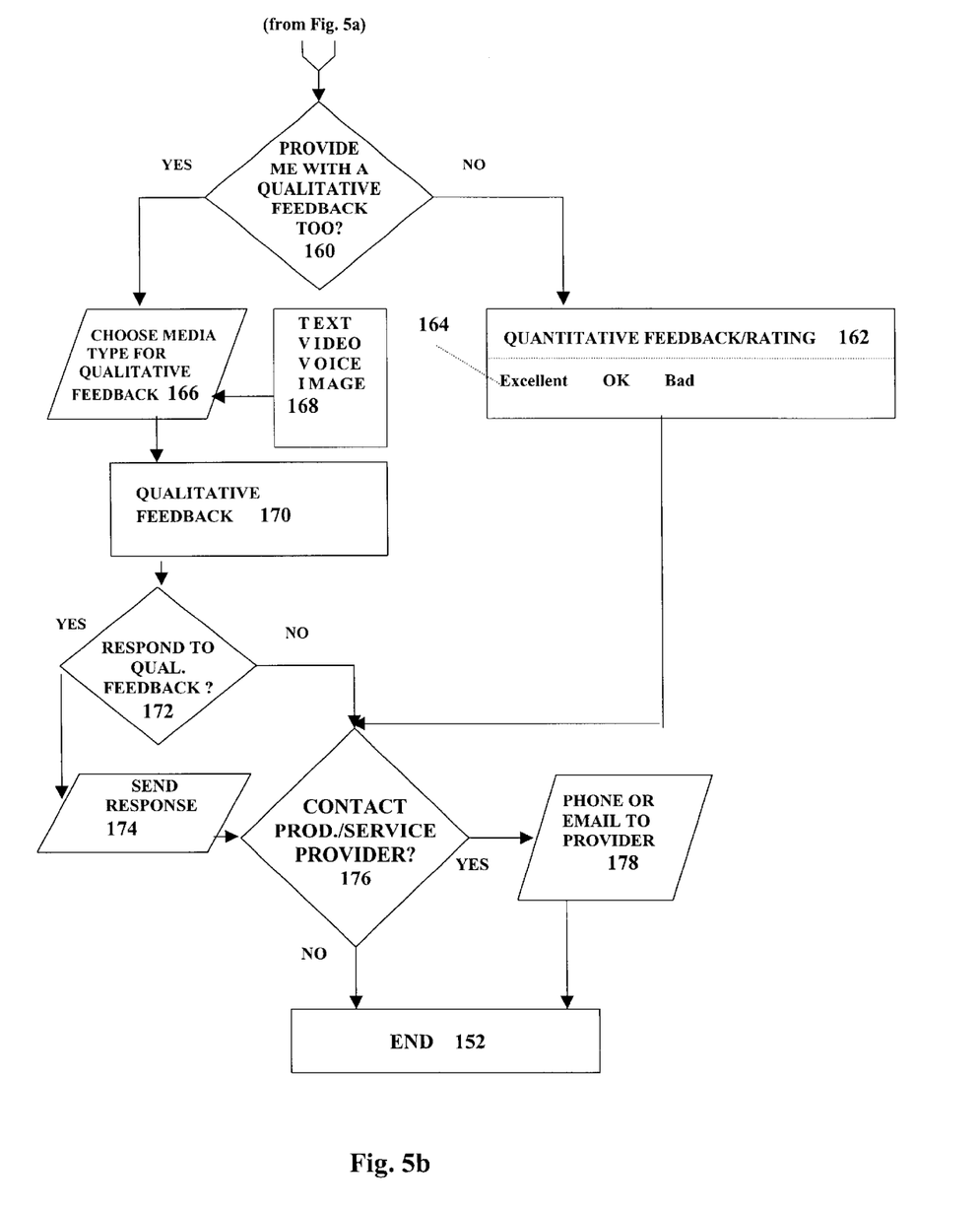

FIGS. 5a and 5b depict a flow chart of the feedback/rating retrieval process in accordance with the principles of the present invention. The reference numbers in parentheses after a step number in the flow-chart represent the analog of the field in the interface form 130 as shown in FIG. 4.

A user enters the system at Start block 140 and in block 142 (110) chooses the category to retrieve associated with a user-defined service or product whose feedback is desired. It is possible to browse Feedback Server 22 (see FIG. 1) in order to find a suitable category from which to download help menus or a user can simply enter a category name directly.

The user then enters a specified Name in block 144 (112) for the item. Again, it is possible to browse the Feedback Server 22 (FIG. 1) in order to find the appropriate name, using directing menus or by direct entry.

At block 146 (122), a user chooses an appropriate community to "consult with" regarding feedback and ratings for the item. In decision block 148, the user is queried regarding the listing of the item in the system databases. In case the community that the user has chosen to consult does not have any feedback or ratings stored for the required item, the user has the option to choose one of the public communities or ask the system to suggest a public community in block 150. System Suggestion in block 154 is then provided to the user who moves forward to the next step in the retrieval process. If the user does not choose to accept the system suggestion in block 150, the user has the option to exit the system in End block 152.

The next step in the retrieval search process is responding to a decision block 156 (114) which provides users with the option for adding a location parameter for their feedback/ratings. If affirmative, the user is put in contact in block 158 with the location server 26 (shown in FIG. 1) and connected to a location determiner, such as User Location Determiner 12 (as shown in FIG. 1). Optionally, a user may manually enter a location, in the event that a location determiner is unavailable in real-time, or that the user wants information relative to a different location than the one in which the user is located.

Another service this system provides is feedback and rating for a whole category of a product or service. For example, the system is enabled to provide a list of books sorted by rating, while a qualitative feedback for each item is also available.

Referring now to FIG. 5b, continuing with the flow chart depicted in FIG. 5a, there is shown decision block 160 which provides a user with the option to select either a qualitative feedback or to get only quantitative ratings by advancing to block 162 (116). Rating block 162 (116) provides a user with menu 164 (38) for ratings as found on Retrieval Interface 130 (see FIG. 4) in accordance with the fields given there for factors, including price, quality, impression of service, location, and a general evaluation (see FIG. 4 with details under quantitative rating 116). Menu 164 (38) is a rating scale, which, in a preferred embodiment gives the ratings numbers such as "Excellent" is 10, "OK" is 5, and "Bad" is 0, or any similar rating scale. The numbers are simple averages, since this is the method of calculation used in the preferred embodiment of the invention. Other methods can be used as are known to those skilled in the art.

In case a qualitative feedback is needed, the user chooses the Media Output Type in block 166 (120) which provides menu field 168 which allows various options for receiving system feedback/ratings. For example, if "Text" is chosen, the system response will be presented on screen in field 118 of data output interface form 130.

After retrieving the qualitative feedback in block 170 (118), the user has the option in decision block 172 (124) to respond to feedback from the relevant community or to ask them to elaborate on that feedback (e.g., "Why should I go to see that waterfall?"; "Is it so good that it is worth driving all day to get there?"). If the user responds affirmatively in block 172 (124), a response is sent via the system in block 174 directed to Central Office 20 (FIG. 1) where it is processed and possibly merged with other information stored in the system's databases. If no response to the feedback is chosen by a user in the step shown by block 172 (124), the user is given the further option in decision block 176 to contact the provider of the product or service that has the required service or product. This contact can be via phone call (click and call) or by e-mail (click and mail) as performed in block 178. User response to qualitative feedback is optional and intended to enable the system to be user friendly as well as to refine future feedback and rating information stored in the system databases to more closely meet the needs of users. The user concludes and exits the feedback/ratings retrieval process at End block 152.

Having described the invention in regard to certain specific embodiments thereof, it is to be understood that the description is not meant as a limitation, since further modifications may now suggest themselves to those skilled in the art, and it is intended to cover such modifications as may fall within the scope of the appended claims.

I claim:

1. A network system for providing and retrieving feedback and rating information in real-time in regard to products, services, or the providers of products or services, based on one or more user-defined communities of interest, said network system comprising:

a data input device operable to facilitate entry of data by a user;

a user location determiner operable to determine the location of said user;

a first interface operable to provide feedback categories and rating information, said categories and rating information being associated with said data entered by said user;

a second interface operable to retrieve feedback and rating information and present them to said user;

a feedback and rating information server in communication with said data input device operable to process said data;

a communities server in communication with said data input device and operable to provide details about communities with which said user defines a relationship; and a location server in communication with said user location determiner and operable to provide details of providers of products and services in relation to said user location.

2. The network system of claim 1, wherein said data input device comprises an electronic telecommunications device and a freehand data entry device operable to facilitate freehand written communication.

3. The network system of claim 2, wherein said electronic telecommunications device comprises a telecommunications device connected in a wireline telephone system.

4. The network system of claim 2, wherein said electronic telecommunications device comprises a wireless mobile cellular telephone.

5. The network system of claim 2, wherein said freehand data entry device comprises an electronic pen device and an electronic terminal device.

6. The network system of claim 5, wherein said terminal device is a wireless electronic notepad, enabling freehand writing or drawing.

7. The network system of claim 1, wherein said user location determiner is operable to provide details of at least one of products, services and providers thereof in relation to said user location.

8. The network system of claim 7, wherein said user location determiner comprises a system for locating the position of said user with reference to global position and in relation to the location of at least one of selected providers of products or services.

9. The network system in claim 7, wherein said user location determiner compromises a terrestrial based system for locating the position of said user and in relation to the location of at least one of selected providers of products or services, said terrestrial based system based on one or more of the group AOA, POA, Phased Array, TOA, or DTOA.

10. The network system of claim 1, wherein said first interface comprises a display containing a digitized form for producing said feedback and rating information.

11. The network system of claim 10, wherein said feedback and rating information are sorted and matched with rating information for a whole category of products, services, and providers of products and services.

12. The network system of claim 10, wherein said feedback and rating information are provided to said users for individual items.

13. The network system of claim 10, wherein said feedback and rating information are additionally provided with a qualitative feedback for each item retrieved by said user.

14. The network system of 13, wherein said selected community of users provide said feedback and ratings information to the system.

15. The network system of claim 13, wherein said selected community of users retrieve said feedback and ratings information from the system.

16. The network system of claim 13, wherein said selected community of users comprise mobile cellular telephone users.

17. The network system of claim 1, wherein said second interface comprises a digitized form for retrieving and displaying said feedback and rating information.

18. The network system of claim 1, wherein said feedback and rating information are associated with a selected community of users.

19. The network system of claim 1, wherein said communities server is operable to store and process data regarding various, user-defined communities and user-members.

20. The network system of claim 1, wherein said feedback and rating information server comprises quantitative and qualitative elements.

21. The network system of claim 20, wherein said qualitative feedback is enabled using a media such as voice, freehand writing, drawing, and/or keyboard text (via phone buttons).

22. The network system of claim 21, wherein said quantitative rating information is provided to a user in a display containing a digitized, rating information interface form.

23. The network system of claim 21, wherein said quantitative rating information is provided to users using a scale comprised of at least one of a predetermined number, letter, or combination thereof.

24. The network system of claim 1, wherein said feedback is qualitative.

25. The network system of claim 1, wherein said rating information is quantitative.

26. The network system of claim 1, wherein said network system comprises media containing a software program for providing or retrieving feedback and rating information operable in said network system.

* * * * *